United States Patent
Blomquist et al.

(10) Patent No.: US 8,356,473 B2
(45) Date of Patent: Jan. 22, 2013

(54) INJECTION DEVICE

(75) Inventors: Micael Blomquist, Kvissleby (SE);
Magnus Thorsell, Sundsvall (SE);
Sören Andersson, Liden (SE); Claes Åkerlund, Söråker (SE)

(73) Assignee: STT Emtec AB, Sundsvall (SE)

( * ) Notice: Subject to any disclaimer, the term of this patent is extended or adjusted under 35 U.S.C. 154(b) by 758 days.

(21) Appl. No.: 12/223,741

(22) PCT Filed: Feb. 6, 2007

(86) PCT No.: PCT/SE2007/050073
§ 371 (c)(1),
(2), (4) Date: Jan. 12, 2009

(87) PCT Pub. No.: WO2007/091969
PCT Pub. Date: Aug. 16, 2007

(65) Prior Publication Data
US 2009/0211237 A1    Aug. 27, 2009

(30) Foreign Application Priority Data

Feb. 8, 2006 (SE) ...................... 0600270

(51) Int. Cl.
*F01N 3/24* (2006.01)
(52) U.S. Cl. ........................... 60/295; 60/301
(58) Field of Classification Search ............ 60/286, 60/295, 303, 301; 239/424, 424.5; 137/889
See application file for complete search history.

(56) References Cited

U.S. PATENT DOCUMENTS

| | | | |
|---|---|---|---|
| 3,829,015 A * | 8/1974 | Monro | 239/425 |
| 4,516,728 A * | 5/1985 | Whinfrey | 239/399 |
| 5,601,792 A | 2/1997 | Hug et al. | |
| 5,645,804 A | 7/1997 | Sumiya et al. | |
| 5,884,475 A * | 3/1999 | Hofmann et al. | 60/274 |
| 6,293,097 B1 * | 9/2001 | Wu et al. | 60/286 |
| 6,865,881 B2 * | 3/2005 | Monro, Jr. | 60/286 |
| 2004/0222317 A1 | 11/2004 | Huffman | |
| 2007/0186542 A1 * | 8/2007 | Hirata | 60/286 |

FOREIGN PATENT DOCUMENTS

| | | |
|---|---|---|
| DE | 19856366 | 4/2000 |
| EP | 849443 | 6/1998 |
| WO | 90/05000 | 5/1990 |
| WO | 01/34950 | 5/2001 |
| WO | 2004/030827 | 4/2004 |
| WO | WO 2005012702 A1 * | 2/2005 |

* cited by examiner

*Primary Examiner* — Thomas Denion
*Assistant Examiner* — Jonathan Matthias
(74) *Attorney, Agent, or Firm* — Dilworth & Barrese, LLP.

(57) ABSTRACT

A device is provided for injection of a liquid agent, such as fuel or reducing agent, into the exhaust line from a combustion engine. The device (1) has a nozzle arrangement (20) having a nozzle head (21), from which the liquid agent is injectable into the exhaust line. The nozzle arrangement (20) has a first conduit (22) leading to the nozzle head (21) for supply of compressed gas, preferably in the form of compressed air, to the nozzle head, and a second conduit (23) leading to the nozzle head (21) for supply of the liquid agent to the nozzle head. The nozzle head (21) is provided with at least one outlet opening (24) connected to the first conduit (22) and to the second conduit (23), through which outlet opening the liquid agent is injectable into the exhaust line under atomization thereof after mixing with compressed gas in a mixing zone (25) inside the nozzle head.

16 Claims, 2 Drawing Sheets

INJECTION DEVICE

FIELD OF THE INVENTION AND PRIOR ART

The present invention relates to a device for injection of a liquid agent, such as fuel or reducing agent, into the exhaust line from a combustion engine, which device comprises a nozzle arrangement having a nozzle head, from which the liquid agent is injectable into the exhaust line.

BACKGROUND OF THE INVENTION

An injection device of the above-mentioned type for injection of fuel into an exhaust line upstream of an oxidation catalyst in order to achieve regeneration of a particle filter arranged in the exhaust line downstream of the oxidation catalyst is previously known for instance from FR 2 829 180 A1 and GB 2 064 983 A. In the injection device according to FR 2 829 180 A1, the fuel is mixed with compressed air in a mixing chamber, whereupon the fuel/air mixture is directed to a nozzle, which injects the mixture into the exhaust line under atomization of the fuel. In the injection device according to GB 2 064 983 A, the fuel is injected into the exhaust line via a nozzle arranged in the exhaust line, without preceding mixing with compressed air. It has been found that it is difficult to achieve a satisfactory atomization of the fuel in the exhaust gases when injection devices of these previously known types are used.

An injection device of the type mentioned by way of introduction for injection of reducing agent into an exhaust line upstream of an SCR catalyst (SCR=Selective Catalytic Reduction) is previously known for instance from U.S. Pat. No. 6,273,120 B1. In the injection device according to U.S. Pat. No. 6,273,120 B1, the reducing agent is mixed with compressed air in a mixing chamber, whereupon the reducing agent/air mixture is directed to a nozzle, which injects the mixture into the exhaust line under atomization of the reducing agent. It has been found that it is difficult to achieve a satisfactory atomization of the reducing agent in the exhaust gases when an injection device of this previously known type is used.

OBJECT OF THE INVENTION

The object of the present invention is to provide a device for injection of a liquid agent into the exhaust line from a combustion engine, which device makes possible a good atomization of the liquid agent in the exhaust gases flowing through the exhaust line and which at the same time makes possible a rapid change of the amount of liquid agent that is injected into the exhaust line.

SUMMARY OF THE INVENTION

According to the invention, said object is achieved by an injection device having the features defined herein.

The inventive injection device comprises a nozzle arrangement having a nozzle head, from which the liquid agent is injectable into the exhaust line, wherein:

the nozzle arrangement comprises a first conduit leading to the nozzle head for supply of compressed gas, preferably in the form of compressed air, to the nozzle head, and a second conduit leading to the nozzle head for supply of said liquid agent to the nozzle head; and the nozzle head is provided with at least one outlet opening connected to the first conduit and to the second conduit, through which outlet opening said liquid agent is injectable into the exhaust line under atomization thereof after mixing with compressed gas in a mixing zone inside the nozzle head.

By allowing the liquid agent to mix with compressed gas inside the nozzle head, i.e. in a limited space immediately before the thus obtained mixture is ejected from the nozzle head via the outlet opening, a change in the dosing of the liquid agent will very rapidly affect the amount of liquid agent that is injected into the exhaust line via the nozzle head. At the same time, a first atomization of the liquid agent is obtained when the liquid agent is admixed into the flow of compressed gas inside the nozzle head, and a further atomization of the liquid agent is obtained when the liquid agent together with said gas is injected into the exhaust line via the outlet opening of the nozzle head. Hereby, it will be possible to achieve a satisfactory atomization of the liquid agent.

An embodiment of the invention is characterized in:

that the device comprises a valve housing, which is connected to the nozzle arrangement and which accommodates valves for controlling the supply of compressed gas and liquid agent to said first and second conduits of the nozzle arrangement;

that said first and second conduits form a common conduit pipe with the first conduit arranged on the outside of the second conduit; and that said conduit pipe at one end is attached to the valve housing and at its other end is attached to the nozzle head and thereby connects the valve housing to the nozzle head.

By combining the two conduits for compressed gas and liquid agent, respectively, into a common conduit pipe, only one conduit pipe needs to be laid between the valve housing and the nozzle head, which facilitates the mounting of the inventive injection device at an exhaust line. Owing to the fact that the first conduit surrounds the second conduit, the first conduit will furthermore form a mechanically protecting protective cover for the second conduit and protect the second conduit from impacts and hits during and after the mounting of the injection device at an exhaust line. This protective effect is particularly important when the second conduit intended for liquid agent is relatively thin and thin-walled, which is often desirable in an injection device of the type here in question.

According to another embodiment of the invention, the nozzle head comprises a first channel connected to the first conduit for directing compressed gas up to the outlet opening, and a second channel connected to the second conduit, wherein one or several inlet holes connected to the second channel lead to the first channel with the respective inlet hole so arranged that compressed gas is allowed to flow through the first channel past the inlet hole and carry along to the outlet opening liquid agent flowing out of the inlet hole. The liquid agent is consequently introduced into the compressed gas flowing through the first channel so that this gas is allowed to efficiently subject the agent flowing into the first channel to an atomizing effect.

According to another embodiment of the invention, the nozzle head is arranged inside the exhaust line, and at least the parts of the first conduit and the second conduit that extend into the exhaust line up to the nozzle head are coaxially arranged in relation to each other with the first conduit arranged on the outside of the second conduit. Hereby, the compressed gas flowing through the first conduit during the injection of the reducing agent may have a cooling and heat insulating effect with respect to the liquid agent which simultaneously is in the second conduit. Hereby, it is in a simple and efficient manner possible to prevent that heat transfer from hot exhaust gases in the exhaust line will cause an undesired overheating of the liquid agent during its passage through the second conduit up to the nozzle head.

According to another embodiment of the invention, said outlet opening in the nozzle head is directed against the intended flowing direction of exhaust gases flowing through the exhaust line. This consequently implies that the liquid agent is injected into the exhaust line in the counter-flow direction of the exhaust line, whereby the injected liquid drops will be transported a longer distance and get a longer dwell time in the exhaust line as compared to a conventionally designed injection device where the injection takes place in the flowing direction of the exhaust line. An increased dwell time for the liquid drops in the exhaust line will give an improved possibility to secure a desired evaporation of the liquid drops before they reach a catalyst arranged downstream of the nozzle head.

According to another embodiment of the invention, the device comprises a pressure sensor arranged to generate a pressure value representing the pneumatic pressure in the first conduit of the nozzle arrangement, and an electronic control unit, which is connected to the pressure sensor and arranged to generate information as to the functionality of the nozzle arrangement based on said pressure value. The electronic control unit may for instance be adapted to detect, by analysing said pressure value, clogging of the outlet opening of the nozzle head or any other malfunction of the nozzle arrangement that has an influence on the pressure in the first conduit, such as for instance the loss of the nozzle head or leakage.

According to another embodiment of the invention, the device comprises a first gas inlet intended to receive said compressed gas and a second gas inlet, which is connected to at least one of said first and second conduits of the nozzle arrangement and which is intended to receive compressed air from the inlet air channel of the combustion engine so as to make possible discharge of this air through the outlet opening of the nozzle head and thereby counteract clogging of the outlet opening during periods when no injection of said compressed gas and/or said liquid agent is effected via the nozzle head. Hereby, it is in a simple manner possible to counteract a clogging of said outlet opening caused by the exhaust gases flowing through the exhaust line.

Other preferred embodiments of the invention will appear from the subsequent description.

The invention also relates to the use of an inventive device in a motor vehicle for injection of fuel into the exhaust line from the combustion engine of the motor vehicle upstream of an oxidation catalyst arranged in the exhaust line in connection with regeneration of a filter arranged in the exhaust line downstream of the oxidation catalyst or in connection with regeneration of a $NO_x$ trap arranged in the exhaust line downstream of the oxidation catalyst. Furthermore, the invention relates to the use of an inventive device in a motor vehicle for injection of reducing agent into the exhaust line from the combustion engine of the motor vehicle upstream of an SCR catalyst or a lean $NO_x$ catalyst arranged in the exhaust line.

BRIEF DESCRIPTION OF THE DRAWINGS

The invention will in the following be more closely described by means of embodiment examples, with reference to the appended drawings. It is shown in.

DETAILED DESCRIPTION OF PREFERRED EMBODIMENTS OF THE INVENTION

Figure 1:
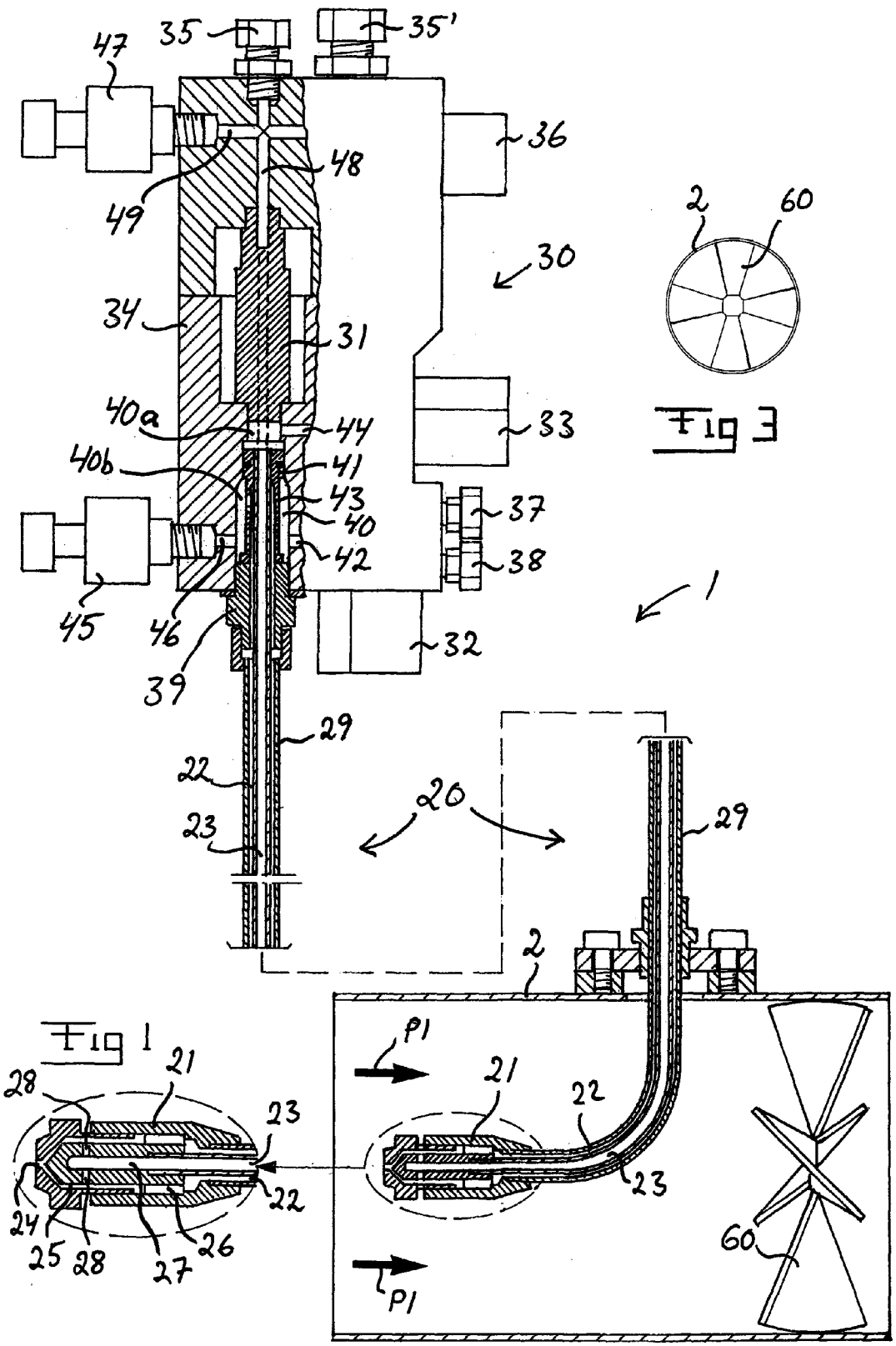
FIG. 1 a schematic, partly cut lateral view of a device according to the present invention, with the nozzle head included in the device shown in a detail enlargement, FIG. 2 an outline diagram of a device according to the present invention in combination with a combustion engine, and FIG. 3 a schematic frontal view of a component of the device illustrated in FIG. 1.
Figure 2:
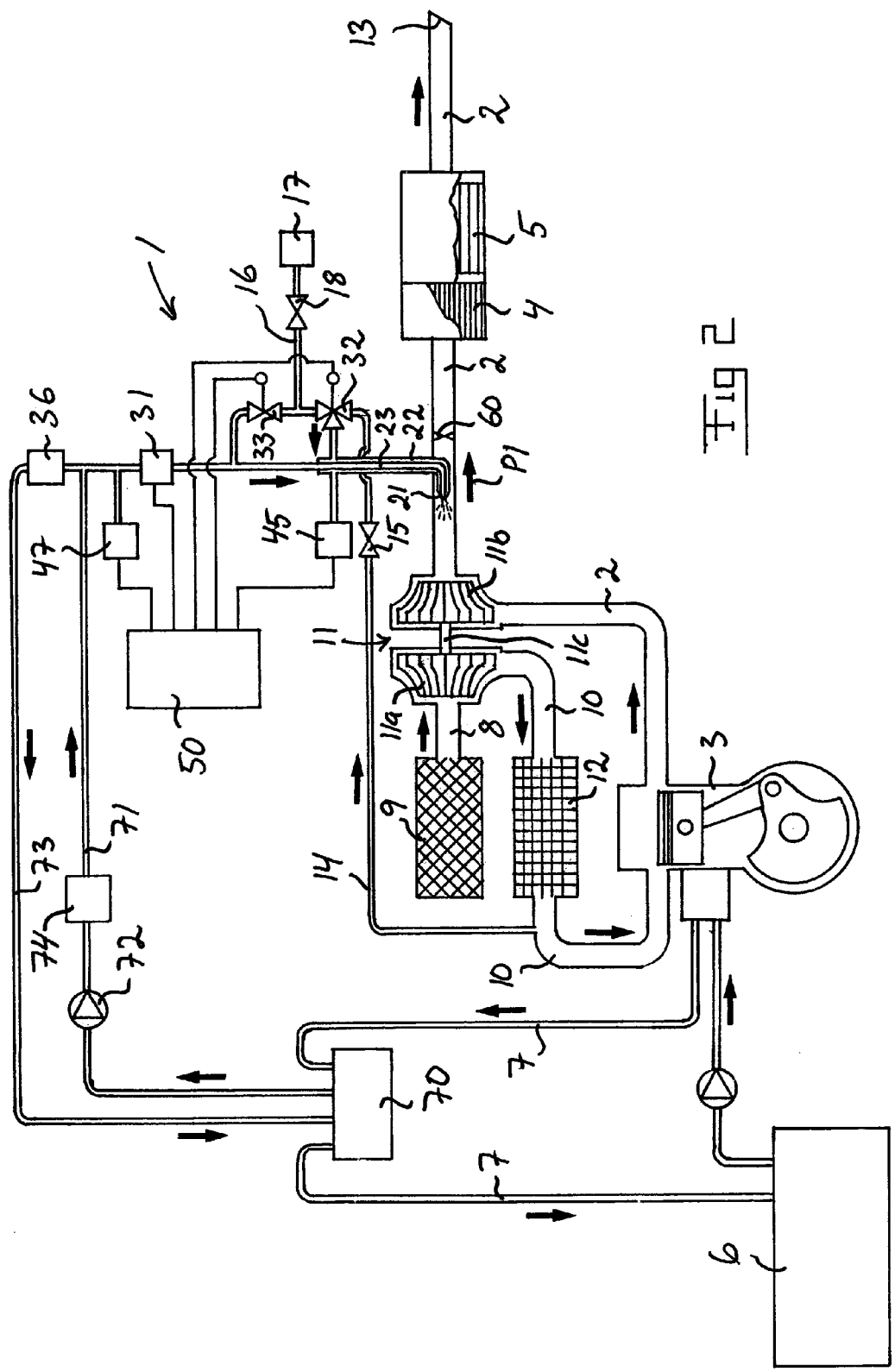

A device 1 according to the present invention for injection of a liquid agent, such as fuel or reducing agent, into the exhaust line 2 from a combustion engine 3 is illustrated in FIGS. 1 and 2. The device 1 comprises a nozzle arrangement 20 having a nozzle head 21, from which the liquid agent is intended to be injected into the exhaust line. The nozzle arrangement 20 comprises a first conduit 22 leading to the nozzle head 21 for supply of compressed gas, preferably in the form of compressed air, to the nozzle head, and a second conduit 23 leading to the nozzle head 21 for supply of said liquid agent to the nozzle head. The nozzle head 21 is provided with an outlet opening 24 connected to the first conduit 22 and to the second conduit 23, through which outlet opening said liquid agent is injectable into the exhaust line under atomization thereof after mixing with compressed gas in a mixing zone inside the nozzle head. In the illustrated example, the nozzle head 21 is provided with one such outlet opening 24, but two or more such outlet openings 24 could alternatively be arranged in the nozzle head.

In the embodiment illustrated in FIG. 1, the nozzle head 21 comprises a first channel 26 connected to the first conduit 22 for directing compressed gas up to the outlet opening 24, and a second channel 27 connected to the second conduit 23. One or several inlet holes 28 connected to the second channel 27 lead to the first channel 26, the respective inlet hole 28 being so arranged that compressed gas is allowed to flow through the first channel 26 past the inlet hole 28 and carry along to the outlet opening 24 liquid agent flowing out of the inlet hole. The second channel 27 is consequently in fluid communication with the first channel 26 via said inlet holes 28. The first channel 26 and the second channel 27 are suitably coaxially arranged in relation to each other, as illustrated in FIG. 1, the first channel 26 preferably being arranged on the outside of the second channel 27. In the illustrated example, the respective inlet hole 28 extends radially between the first channel 26 and the second channel 27, i.e. radially in relation to the centre axis of said channels 26, 27, whereby the liquid agent will flow into the compressed gas flowing through the first channel 26 past the inlet holes 28 essentially perpendicularly to the flowing direction of this gas. In this case, the above-mentioned mixing zone 25 is consequently formed by the part of the first channel 26 extending between the inlet holes 28 and the outlet opening 24. The liquid agent is atomized by and mixed with the compressed gas when the agent via the inlet holes 28 enters the mixing zone 25 and is then transported further on together with the compressed gas up to and out through the outlet opening 24. At the passage through the outlet opening 24, a further atomization of the liquid agent takes place. The inlet holes 28 are suitably two or more in number and distributed in the circumferential direction of the second channel.

The device 1 further comprises a valve arrangement 30 connected to the nozzle arrangement 20, which valve arrangement comprises valves 31, 32, 33 for controlling the supply of compressed gas and liquid agent to the conduits 22, 23 of the nozzle arrangement. In the illustrated example, these valves 31, 32, 33 are mounted in a common valve housing 34.

Said first and second conduits 22, 23 form a common conduit pipe 29 with the first conduit 22 arranged on the outside of the second conduit 23. This conduit pipe 29 is at one end attached to the valve housing 34 and is at its other end attached to the nozzle head 21 and thereby connects the valve housing 34 to the nozzle head 21. The first conduit 22 is suitably formed of a flexible pipe of heat-resisting material, such as for instance a Teflon pipe or a corrugated steel pipe, and may for instance have an external diameter of about 10-15 mm. The second conduit 23 is suitably formed of a steel pipe which is thin and thin-walled and thereby bendable, and may for instance have an internal diameter of about 2 mm and an external diameter of about 3-4 mm.

The valve arrangement 30 comprises a regulating valve 31, which controls the supply of liquid agent to the second conduit 23 of the nozzle arrangement. This regulating valve 31 is suitably a pulse width modulated injection valve. By means of this valve 31, it is possible to control the amount of liquid agent to be injected into the exhaust line, i.e. the dosing of the liquid agent. In the illustrated embodiment, an inlet 35 intended to receive said liquid agent is arranged in the valve housing 34. The liquid agent is directable from the inlet 35 and into the second conduit 23 via the regulating valve 31. A pressure regulator 36 is arranged in the valve housing 34 in order to secure a desired pressure of the liquid agent directed up to the regulating valve 31 via the inlet 35.

The valve arrangement 30 further comprises a first control valve 32, through which the first conduit 22 of the nozzle arrangement is connectable to a source of compressed gas, suitably in the form of a compressed-air source. It is consequently possible by means of this control valve 32 to control the supply of compressed gas to the first conduit 22. In the illustrated example, the first control valve 32 is a three way valve.

In the illustrated example, the valve arrangement 30 also comprises a second control valve 33, through which the second conduit 23 of the nozzle arrangement is connectable to said source of compressed gas in order to clean off the second conduit 23 by blowing at desired occasions. It is consequently possible by means of this control valve 33 to control the supply of compressed gas to the second conduit 23.

In the illustrated embodiment, a first gas inlet 37 and a second gas inlet 38 are arranged in the valve housing 34. The first gas inlet 37 is intended to receive said compressed gas. The compressed gas is directable from the first gas inlet 37 and into the first conduit 22 via the first control valve 32, and this gas is directable from the first gas inlet 37 and into the second conduit 23 via the second control valve 33. The second gas inlet 38 is intended to receive compressed air from the inlet air channel of the combustion engine. The air is directable from the second gas inlet 38 and into the first conduit 22 via the first control valve 32. Thus, the compressed air received via the second gas inlet 38 is directable up to the nozzle head 21 via the first conduit 22 so as to be discharged through the outlet opening 24 of the nozzle head and thereby counteract clogging of the outlet opening during periods when no injection of said compressed gas and/or said liquid agent is effected via the nozzle head 21.

The nozzle arrangement 20 is connected to the valve arrangement 30 via an interconnection mechanism 39. In the illustrated example the second conduit 23 of the nozzle arrangement 20 extends a distance into an outlet channel 40 arranged in the valve housing 34. The end of the conduit 23 received in the outlet channel 40 is retained in its place in the outlet channel by means of a sleeve-shaped holding member 41, which supports the conduit 23 in a radial direction. This holding member 41 is together with the conduit 23 dividing the outlet channel 40 into a first space 40a for receiving liquid agent from the regulating valve 31 and a second space 40b for receiving compressed gas. A channel 42 connected to the control valve 32 leads to the second space 40b, and this channel 42 is connected to the first conduit 22 of the nozzle arrangement 20 via openings 43 in the holding member 41. A channel 44 connected to the control valve 33 leads to the first space 40a in order to make cleaning off of the second conduit 23 possible by means of compressed gas.

In the illustrated example, the device 1 comprises a pressure sensor 45 arranged to generate a pressure value representing the pneumatic pressure in the first conduit 22 of the nozzle arrangement. The pressure sensor 45 is mounted in the valve housing 34 and is in communication with the first conduit 22 via a channel 46 extending between the pressure sensor and the outlet channel 40. The pressure sensor 45 is connected to an electronic control unit 50 (see FIG. 2), which is arranged to generate information as to the functionality of the nozzle arrangement 20 and/or valve arrangement 30 based on said pressure value. The electronic control unit 50 is with advantage adapted to detect, by analysing said pressure value, clogging of the outlet opening 24 of the nozzle head and/or leakage of the nozzle arrangement 20 and/or damaged or lost nozzle head. This detection is suitably performed when compressed gas is directed through the nozzle arrangement in order to clean off the nozzle arrangement by blowing, for instance before and/or after an injection of liquid agent into the exhaust line.

In the illustrated example, the device 1 also comprises a pressure sensor 47 arranged to generate a pressure value representing the hydraulic pressure of the liquid agent upstream of the regulating valve 31. This pressure sensor 47 is mounted in the valve housing 34 and is in communication with an inlet channel 48 for the liquid agent arranged in the valve housing via a channel 49 extending between the pressure sensor 47 and this inlet channel 48. Also the pressure sensor 47 may be connected to said electronic control unit 50, as illustrated in FIG. 2.

The nozzle head 21 is suitably arranged inside the exhaust line, as illustrated in FIGS. 1 and 2. In this case, it is advantageous to arrange the parts of the first conduit 22 and the second conduit 23 that extend into the exhaust line up to the nozzle head 21 coaxially in relation to each other, with the first conduit 22 arranged on the outside of the second conduit 23. The first conduit 22 and the second conduit 23 are suitably coaxially arranged in relation to each other all the way between the valve housing 34 and the nozzle head 21.

In order to increase the dwell time for the liquid agent in the exhaust gases, i.e. the time during which the liquid agent after the injection into the exhaust line is in contact with the exhaust gases in the exhaust line before reaching the intended catalyst together with the exhaust gases, the outlet opening 24 of the nozzle head is with advantage directed against the intended flowing direction of exhaust gases flowing through the exhaust line, as illustrated in FIGS. 1 and 2. This flowing direction is indicated by the arrows P1 in FIGS. 1 and 2. In the illustrated example, the nozzle head 21 is arranged inside the exhaust line, in the centre thereof, and is directed against the intended flowing direction of exhaust gases flowing through the exhaust line.

A guiding member 60 is with advantage arranged in the exhaust line 2 downstream of the nozzle head 21, which guiding member 60 is arranged to be flown through by exhaust gases and create turbulence in the passing exhaust gases so as to thereby achieve an increased dispersion of the liquid agent which accompanies the exhaust gases after having been injected into the exhaust line 2 via the nozzle head 21. Hereby, the possibilities of achieving a uniform dispersion and rapid evaporation of the liquid agent in the exhaust gases before the agent reaches the intended catalyst are improved. The guiding member 60 also helps to catch drops of liquid agent which have not yet been evaporated after the injection into the exhaust line 2.

The functioning of a device 1 of the type illustrated in FIG. 1 will in the following be described with reference to FIG. 2. FIG. 2 illustrates an application where the device 1 is used in a motor vehicle for injection of liquid agent in the form of fuel into the exhaust line 2 from the combustion engine 3 of the motor vehicle upstream of an oxidation catalyst 4 arranged in the exhaust line in connection with regeneration of a filter 5 arranged in the exhaust line downstream of the oxidation catalyst. However, the inventive device 1 is also usable in a motor vehicle for injection of liquid agent in the form of fuel in the exhaust line from the combustion engine of the motor vehicle upstream of an oxidation catalyst arranged in the exhaust line in connection with regeneration and desulphurization of a $NO_x$ trap arranged in the exhaust line downstream of the oxidation catalyst. Furthermore, the inventive device 1 is usable in a motor vehicle for injection of liquid agent in the form of reducing agent, such as for instance urea or fuel, into the exhaust line from the combustion engine of the motor vehicle upstream of an SCR catalyst or lean $NO_x$ catalyst arranged in the exhaust line.

In the example illustrated in FIG. 2, the device 1 comprises a fuel receptacle 70, which is connected to the above-mentioned inlet 35 in the valve housing 34 via a supply conduit 71. A pump 72 is arranged in the supply conduit 71 for supplying fuel from the receptacle 70 to the regulating valve 31 of the valve arrangement 30. A fuel filter 74 is also arranged in the supply conduit 71. A return conduit 73 directs excess fuel from the valve arrangement 30 back to the fuel receptacle 70 via an outlet 35' in the valve housing 34. The fuel receptacle 70 is connected into a return fuel conduit 7 extending between the combustion engine 3 and a fuel tank 6 in order to receive return fuel from the combustion engine. Said fuel tank 6 constitutes a regular tank for engine fuel of the motor vehicle.

Air is taken to the combustion engine 3, which is schematically shown in FIG. 2, via an air intake 8, adjacent to which an air filter 9 may be arranged. The air is directed through an inlet air channel, generally denoted 10, towards the combustion chambers of the combustion engine. In the example illustrated in FIG. 2, the motor vehicle is provide with a turbo charger 11, which comprises a compressor wheel 11a for feeding the air to the combustion engine with over-pressure and a turbine wheel 11b placed so as to be put into rotation by activation of exhaust gases leaving the combustion engine. The compressor wheel 11 and the turbine wheel 11b are operationally couplet to each other, for instance by being placed on one and the same shaft 11c. As is usual in super charging, the air may, after having been imparted to over-pressure, be subjected to cooling in a charging air cooler 12 (intercooler). The exhaust gases exiting the combustion engine 3 move in the exhaust line 2 and enter into the surroundings via an exhaust gas outlet 13. FIG. 2 illustrates how the exhaust gases are directed through the above-mentioned oxidation catalyst 4 and filter 5 before entering into the surroundings via the exhaust gas outlet 13. The filter 5 is arranged to liberate the exhaust gases from particulate constituents. In the illustrated example, the nozzle head 21 is arranged in the exhaust line 2 between the turbine wheel 11b and the oxidation catalyst 4 with its outlet opening 24 directed against the flowing direction of exhaust gases flowing through the exhaust line 2. The above-mentioned second gas inlet 38 of the valve arrangement 30 is via a conduit 14 connected to the inlet air channel 10 downstream of the compressor wheel 11a in order to receive air that has been compressed by the compressor wheel. A non-return valve 15 is suitably arranged in this conduit 14, as illustrated in FIG. 2. In the illustrated example, the conduit 14 is connected to the air inlet channel 10 between the charging air cooler 12 and the combustion engine 3. The above-mentioned first gas inlet 37 of the valve arrangement 30 is via a conduit 16 connected to a compressed-air source 17. A non-return valve 18 is suitably arranged in this conduit 16, as illustrated in FIG. 2. The regulating valve 31 and the control valves 32, 33 of the valve arrangement are controlled in dependence on control signals from an electric control unit 50, which is adapted to send control signals to said valves 31, 32, 33 in dependence on predetermined parameters. These parameters may for instance comprise the exhaust gas temperature upstream of the oxidation catalyst 4, the exhaust gas temperature downstream of the filter 5, the exhaust mass flow, the pressure drop of the exhaust gases across the filter 5 etc. The electronic control unit 50 is in the illustrated example also connected to the above-mentioned pressure sensors 47, 45 in order to receive measuring values from these sensors related to the fuel pressure upstream of the regulating valve 31 and the pressure in the above-mentioned first conduit 22 of the nozzle arrangement 20, respectively.

Before fuel is to be injected into the exhaust line 2, the control valve 33 is opened so that the fuel conduit 23 of the nozzle arrangement, i.e. the above-mentioned second conduit, is cleaned off by means of compressed air from the compressed-air source 17. During this cleaning off, the regulating valve 31 is maintained close. Thereafter, the control valve 33 is closed and the control valve 32 is made to put the air conduit 22 of the nozzle arrangement, i.e. the above-mentioned first conduit, in communication with the compressed-air source 17. By opening the regulating valve 31, fuel is directed into the fuel conduit 23 in order to be mixed with compressed air in the mixing zone 25 in the nozzle head 21 and to be injected into the exhaust line 2 via the outlet opening 24 of the nozzle head together with the compressed air. When sufficient fuel has been injected, the control valve 33 is opened in order to clean off the fuel conduit 23 by blowing. The regulating valve 31 is maintained closed under this cleaning of and up to the next injection occasion. After the cleaning off, the control valve 33 is closed and the control valve 32 is made to put the air conduit 22 in communication with the inlet air channel 10 of the combustion engine for supply of charging air through the air conduit 22 and further out through the outlet opening 24 of the nozzle head. When it is time for the next fuel injection, the control valve 32 is made to interrupt the connection between the air inlet channel 10 and the air conduit 22, and the above-described process is repeated. The process here described may also be used when a device according to the invention is used for injection of reducing agent into an exhaust line from a combustion engine.

The invention is of course not in any way limited to the preferred embodiments described above. On the contrary, many possibilities to modifications thereof should be apparent to a person skilled in the art without thereby deviating from the basic idea of the invention as defined in the appended claims.

The invention claimed is:

1. A device (1) for injection of a liquid agent, such as fuel or reducing agent, into an exhaust line (2) from a combustion engine (3), which device (1) comprises the combination of
    a nozzle arrangement (20) having a nozzle head (21), from which the liquid agent is injectable into the exhaust line (2), wherein
    the nozzle arrangement (20) comprises a first conduit (22) leading to the nozzle head (21) for supply of compressed gas, preferably in the form of compressed air, to the nozzle head (21), and a second conduit (23) leading to the nozzle head (21) for supply of said liquid agent to the nozzle head (21);

the nozzle head (21) is provided with at least one outlet opening (24) connected to the first conduit (22) and to the second conduit (23), through which outlet opening (24) said liquid agent is injectable into the exhaust line (2) under atomization thereof after mixing with compressed gas in a mixing zone (25) inside the nozzle head (21); and a valve arrangement (30) having a housing (34) in which a first gas inlet (37) is configured to receive said compressed gas, and be connected to said first conduit (22) of the nozzle arrangement (20), and a second gas inlet (38) is configured to be connected to at least one of said first and second conduits (22, 23) of the nozzle arrangement (20) and receive compressed air from an inlet air channel (10, 14) of the combustion engine (3) and discharge this air through the outlet opening (24) of the nozzle head (21) and thereby counteract clogging of the outlet opening (24) during periods when no injection of said compressed gas and/or said liquid agent is effected via the nozzle head (21); and additionally comprising interconnection mechanism (39) for interconnecting the nozzle arrangement (20) to the valve housing (34);

a first control valve (32) which is switchable between a first position, in which the first conduit (22) of the nozzle arrangement (20) is connected to the first gas inlet (37), and a second position, in which the first conduit (22) of the nozzle arrangement (20) is connected to the second gas inlet (38);

a second control valve (33) arranged to control flow of compressed gas from the first gas inlet (37) and into the second conduit (23);

a regulating valve (31) arranged to control liquid supply to the second conduit (23);

the valve housing (34) comprising an outlet channel (40), with the second conduit (23) of the nozzle arrangement (20) configured to extend into the outlet channel (40);

a sleeve-shaped holding member (41) configured to retain the second conduit (23) within the outlet channel (40), support the second conduit (23) in a radial direction, and together with the second conduit (23), divide the outlet channel (40) into a first space (40a) for receiving liquid from the regulating valve (31) and a second space (40b) for receiving compressed gas;

the valve housing (34) comprising a first channel (42) connected to the first control valve (32) and leading to the second space (40b);

the holding member (41) comprising openings (43) intercommunicating the first channel (42) with the first conduit (22) of the nozzle arrangement (20); and the valve housing (34) comprising a second channel (44) connected to the second control valve (33) and leading to the first space (40a).

2. A device according to claim 1, wherein
said first and second conduits (22, 23) form a common conduit pipe (29) with the first conduit (22) arranged on the outside of the second conduit (23); and
said conduit pipe (29) at one end is attached to the valve housing (34) and at its other end is attached to the nozzle head (21) and thereby connects the valve housing (34) to the nozzle head (21).

3. A device according to claim 1, wherein
the nozzle head (21) comprises a first channel (26) connected to the first conduit (22) for directing compressed gas up to the outlet opening (24), and a second channel (27) connected to the second conduit (23), and
one or several inlet holes (28) connected to the second channel (23) lead to the first channel (22), the respective inlet hole (28) being so arranged that compressed gas is allowed to flow through the first channel (22) past the inlet hole (28) and carry along to the outlet opening (24) liquid agent flowing out of the inlet hole.

4. A device according to claim 3, wherein the first channel (26) and the second channel (27) are coaxially arranged in relation to each other.

5. A device according to claim 4, wherein the first channel (26) is arranged on the outside of the second channel (27).

6. A device according to claim 4, wherein said inlet holes (28) extend radially between the second channel (27) and the first channel (26).

7. A device according to claim 6, wherein the inlet holes (28) are two or more in number and are distributed in the circumferential direction of the second channel.

8. A device according to claim 1, wherein
the nozzle head (21) is arranged inside the exhaust line, and
at least the parts of the first conduit (22) and the second conduit (23) that extend into the exhaust line up to the nozzle head are coaxially arranged in relation to each other with the first conduit (22) arranged on the outside of the second conduit (23).

9. A device according to claim 1, wherein said outlet opening (24) of the nozzle head (21) is directed against the intended flowing direction of exhaust gases flowing through the exhaust line.

10. A device according to claim 9, wherein the nozzle head (21) is arranged inside the exhaust line, preferably in the centre thereof, and is directed against the intended flowing direction of exhaust gases flowing through the exhaust line.

11. A device according to claim 1, wherein the device (1) comprises:
a pressure sensor (45), which is arranged to generate a pressure value representing the pneumatic pressure in said first conduit (22) of the nozzle arrangement (20); and
a control unit (50) connected to the pressure sensor (45), which control unit is arranged to generate information as to the functionality of the nozzle arrangement (20) based on said pressure value.

12. The combination of a device according to claim 1 in a motor vehicle for injection of fuel into the exhaust line from the combustion engine of the motor vehicle upstream of an oxidation catalyst in connection with regeneration of a filter arranged in the exhaust line downstream of the oxidation catalyst or in connection with regeneration of a $NO_x$ trap arranged in the exhaust line downstream of the oxidation catalyst.

13. The combination of a device according to claim 1 in a motor vehicle for injection of reducing agent into the exhaust line from the combustion engine of the motor vehicle upstream of an SCR catalyst or a lean $NO_x$ catalyst.

14. A device according to claim 1, additionally comprising separate sources (17; 10, 14) of compressed gas respectively coupled to said first and second gas inlets (37, 38).

15. The device according to claim 14, wherein the compressed gas source coupled to said second gas inlet (38) includes the air inlet channel (10, 14) from the combustion engine (3).

16. The device according to claim 1, wherein the first control valve (32) is a three-way valve.

* * * * *